US012564135B2

(12) United States Patent
Boriack et al.

(10) Patent No.: US 12,564,135 B2
(45) Date of Patent: Mar. 3, 2026

(54) SPLIT TOPSHAFT SPROCKET FOR AGRICULTURAL HEADERS

(71) Applicant: CNH Industrial America LLC, New Holland, PA (US)

(72) Inventors: Cale Boriack, Litiz, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 455 days.

(21) Appl. No.: 18/026,739

(22) PCT Filed: Sep. 14, 2021

(86) PCT No.: PCT/US2021/050260
§ 371 (c)(1),
(2) Date: Mar. 16, 2023

(87) PCT Pub. No.: WO2022/060727
PCT Pub. Date: Mar. 24, 2022

(65) Prior Publication Data
US 2023/0309454 A1 Oct. 5, 2023

Related U.S. Application Data

(60) Provisional application No. 63/079,584, filed on Sep. 17, 2020.

(51) Int. Cl.
*A01D 61/04* (2006.01)
*B65G 23/06* (2006.01)
(Continued)

(52) U.S. Cl.
CPC ............. *A01D 61/04* (2013.01); *B65G 23/06* (2013.01); *F16H 55/12* (2013.01); *F16H 55/30* (2013.01)

(58) Field of Classification Search
CPC ........ A01D 61/04; B65G 23/06; F16H 55/12; F16H 55/30
See application file for complete search history.

(56) References Cited

U.S. PATENT DOCUMENTS

| | | | |
|---|---|---|---|
| 1,506,642 A | 8/1924 | Iler | |
| 3,069,922 A * | 12/1962 | Harvey | F16H 55/30 74/448 |

(Continued)

FOREIGN PATENT DOCUMENTS

| | | |
|---|---|---|
| EP | 3135568 A1 | 3/2017 |

OTHER PUBLICATIONS

International Search Report and Written Opinion for PCT Application No. PCT/US2021/050260 dated Dec. 20, 2021 (9 pages).

*Primary Examiner* — Claude J Brown
(74) *Attorney, Agent, or Firm* — Buchanan Ingersoll & Rooney PC

(57) ABSTRACT

A feeder housing shaft sprocket segment comprising: a sprocket segment body (300) extending in a circumferential direction around a center axis (A) from a leading edge (304) to a trailing edge (306), wherein the leading edge (304) and trailing edge (306) subtend a segment angle about the center axis (A), the segment angle being a first unit fraction of 360°; an outer sprocket perimeter (308) comprising a plurality of teeth (310) evenly arranged in the circumferential direction about the center axis (A) with each tooth (310) spaced by a tooth angle from each adjacent tooth (310), the tooth angle being a second unit fraction of 360°; and a plurality of engagement surfaces (312) extending towards the center axis (A) and facing in the circumferential direction (C), the plurality of engagement surfaces (312) being asymmetrical relative to a plane (P) defined by the center axis (A) and a radial projection from the center axis (A) that (Continued)

bisects the sprocket segment body (300) midway between the leading edge (304) and the trailing edge (306).

20 Claims, 4 Drawing Sheets

(51) Int. Cl.

| | | |
|---|---|---|
| *F16H 55/12* | (2006.01) | |
| *F16H 55/30* | (2006.01) | |

(56)                              References Cited

U.S. PATENT DOCUMENTS

| | | | | |
|---|---|---|---|---|
| 3,381,354 | A | * | 5/1968 | Krempa .................. B23F 15/00 |
| | | | | 29/893 |
| 3,960,412 | A | * | 6/1976 | Shuler .................. B62D 55/135 |
| | | | | 474/901 |
| 3,996,814 | A | * | 12/1976 | Westlake ................ F16G 13/04 |
| | | | | 74/447 |
| 4,031,769 | A | | 6/1977 | Kassing |
| 4,058,023 | A | * | 11/1977 | Smith .................... F16H 55/12 |
| | | | | 474/902 |
| 4,111,064 | A | | 9/1978 | Purcell |
| 4,308,019 | A | * | 12/1981 | Horkey .................. F16H 55/30 |
| | | | | 198/834 |
| 4,517,819 | A | * | 5/1985 | Sandroni .................. B21K 1/30 |
| | | | | 72/356 |
| 4,522,611 | A | * | 6/1985 | Hiatt ........................ F16H 55/30 |
| | | | | 474/152 |
| 4,752,281 | A | * | 6/1988 | Lammers ........... B62D 55/0963 |
| | | | | 474/161 |
| 5,026,329 | A | * | 6/1991 | Diekevers ............ B62D 55/135 |
| | | | | 474/162 |
| 5,067,931 | A | * | 11/1991 | Nagamatsu ............. F16H 55/30 |
| | | | | 474/162 |
| 5,380,254 | A | * | 1/1995 | Maguire .............. B62D 55/135 |
| | | | | 474/152 |
| 5,393,134 | A | * | 2/1995 | Oertley ................... F16H 55/12 |
| | | | | 305/199 |
| 6,074,316 | A | | 6/2000 | Murrietta, Sr. |
| 6,146,299 | A | | 11/2000 | Harvey |
| 6,231,136 | B1 | * | 5/2001 | Freeman ............. B62D 55/088 |
| | | | | 305/107 |
| 2011/0049975 | A1 | * | 3/2011 | Mulligan ............... B62D 55/12 |
| | | | | 305/202 |
| 2014/0080645 | A1 | * | 3/2014 | Balash .................... F16H 55/12 |
| | | | | 29/893 |
| 2014/0333125 | A1 | * | 11/2014 | Hoyt ...................... B62D 55/32 |
| | | | | 29/893 |
| 2017/0037951 | A1 | * | 2/2017 | Balash .................. F16H 55/303 |
| 2017/0251603 | A1 | | 9/2017 | Walters et al. |
| 2020/0172197 | A1 | * | 6/2020 | Huang .................. B62M 9/105 |

* cited by examiner

SPLIT TOPSHAFT SPROCKET FOR AGRICULTURAL HEADERS

BACKGROUND OF THE INVENTION

Agricultural combines typically include a feeder that connects the header to the vehicle chassis. The feeder includes a conveyor that carries crop material from the header to the chassis. Such conveyors typically comprise multiple slats that are supported on chains. The chains are driven and supported by sprockets mounted on rotating shafts. In a typical feeder, the conveyors wrap around a relatively large drum at the inlet, and around relatively small sprockets at the outlet. The sprockets are the outlet are rigidly mounted on a common topshaft, such that all of the sprockets rotate in unison to maintain proper timing of the chains.

Feeder sprockets, particularly those at the topshaft, experience wear during use. When the sprockets become worn, the entire topshaft must be removed for service or replacement. Such service is time consuming, and may be required as often as once per 700-1000 operating hours. Such service also requires disassembly of many parts, such as removing the chains, removing the gearbox from the feeder, and removing the feeder housing floor. It has also been found that servicing a conventional topshaft can also risk damage to other critical parts of the equipment.

The inventors have determined that the state of the art of header conveyors can still be improved.

This description of the background is provided to assist with an understanding of the following explanations of exemplary embodiments, and is not an admission that any or all of this background information is necessarily prior art.

SUMMARY

In a first exemplary aspect, there is provided a feeder housing shaft sprocket segment comprising: a sprocket segment body extending in a circumferential direction around a center axis from a leading edge to a trailing edge, wherein the leading edge and trailing edge subtend a segment angle about the center axis, the segment angle being a first unit fraction of 360°; an outer sprocket perimeter comprising a plurality of teeth evenly arranged in the circumferential direction about the center axis with each tooth spaced by a tooth angle from each adjacent tooth, the tooth angle being a second unit fraction of 360°; and a plurality of engagement surfaces extending towards the center axis and facing in the circumferential direction, the plurality of engagement surfaces being asymmetrical relative to a plane defined by the center axis and a radial projection from the center axis that bisects the sprocket segment body midway between the leading edge and the trailing edge.

In some examples, the segment angle is 120°.

In some examples, the plurality of engagement surfaces are located at an inner sprocket perimeter and comprise a plurality of inward radial projections.

In some examples, the at least one inward radial projection comprises a front face extending radially towards the center axis and perpendicular to the circumferential direction.

In some examples, the feeder housing shaft sprocket segment further comprises a web extending circumferentially between at least two of the inward radial projections and offset from the at least two of the inward radial projections along the center axis.

In some examples, at least one of the inward radial projections comprises a curved front face extending towards the center axis.

In some examples, at least one of the plurality of engagement surfaces comprises an enclosed passage extending parallel to the center axis.

In another exemplary embodiment, there is provided a feeder housing shaft sprocket assembly comprising: a shaft configured to rotate about a center axis; a flange rigidly secured to and extending radially from the shaft, the flange comprising a plurality of flange drive surfaces extending away from the center axis; and a plurality of sprocket segments releasably secured to the flange. Each sprocket segment comprises: a sprocket segment body extending in a circumferential direction around a center axis from a leading edge to a trailing edge, wherein the leading edge and trailing edge subtend a segment angle about the center axis, the segment angle being a first unit fraction of 360°, an outer sprocket perimeter comprising a plurality of teeth evenly arranged in the circumferential direction about the center axis with each tooth spaced by a tooth angle from each adjacent tooth, the tooth angle being a second unit fraction of 360°, and a plurality of engagement surfaces extending towards the center axis and facing in the circumferential direction and in contact with a respective one of the flange drive surfaces, the plurality of engagement surfaces being asymmetrical relative to a plane defined by the center axis and a radial projection from the center axis that bisects the sprocket segment body midway between the leading edge and the trailing edge.

In some examples, the flange is permanently fixed to the shaft.

In some examples, the segment angle is 120°.

In some examples, the plurality of flange drive surfaces are located on a flange outer perimeter and comprise a plurality of outward radial projections.

In some examples, the plurality of engagement surfaces of each of the plurality of sprocket segments are located at a respective inner sprocket perimeter of each sprocket segment; the plurality of engagement surfaces of each of the plurality of sprocket segments comprise a respective plurality of inward radial projections; and the respective plurality of inward radial projections contact an adjacent set of the plurality of outward radial projections of the flange.

In some examples, the at least one inward radial projection comprises a front face extending radially towards the center axis and perpendicular to the circumferential direction.

In some examples, the feeder housing shaft sprocket assembly further includes a web extending circumferentially between at least two of the inward radial projections and offset from the at least two of the inward radial projections along the center axis.

In some examples, the web comprises a fastener hole that is offset along the center axis from a corresponding fastener hole in the flange.

In some examples, at least one of the inward radial projections comprises a curved front face extending towards the center axis.

In some examples, the plurality of flange drive surfaces comprise a plurality of pins extending along the center axis, and wherein the plurality of engagement surfaces comprises each comprises an enclosed passage extending parallel to the center axis.

In another exemplary embodiment, there is provided a feeder housing shaft sprocket assembly comprising: a shaft configured to rotate about a center axis; a flange rigidly secured to and extending radially from the shaft and having a repeating pattern of flange drive surfaces; and a plurality of sprocket segments releasably secured to the flange, each sprocket segment having an outer sprocket perimeter comprising a plurality of teeth and a plurality of engagement surfaces configured to engage only a respective portion of the repeating pattern of flange drive surfaces. The teeth of the plurality of sprocket segments are configured to be spaced evenly about the center axis when all of the sprocket segments are secured to the flange, and the repeating pattern of flange drive surfaces and the plurality of engagement surfaces are configured to prevent connection of the plurality of sprocket segments to the flange in a reversed orientation.

In another exemplary embodiment, there is provided an agricultural vehicle comprising: a chassis configured for movement on a surface; a header configured to remove crop material from the surface; and a feeder assembly connected between the header and the chassis, and configured to convey the crop material from the header to the chassis. The feeder assembly has a feeder housing and a feeder conveyor located in the feeder housing and supported at at least one end by a feeder shaft assembly, and the feeder shaft assembly comprises: a shaft configured to rotate about a center axis; a flange rigidly secured to and extending radially from the shaft, the flange comprising a plurality of flange drive surfaces extending away from the center axis; and a plurality of sprocket segments releasably secured to the flange. Each sprocket segment comprises: a body extending in a circumferential direction around a center axis from a leading edge to a trailing edge, wherein the leading edge and trailing edge subtend a segment angle about the center axis, the segment angle being a first unit fraction of 360°, an outer sprocket perimeter comprising a plurality of teeth evenly arranged in the circumferential direction about the center axis with each tooth spaced by a tooth angle from each adjacent tooth, the tooth angle being a second unit fraction of 360°, and a plurality of engagement surfaces extending towards the center axis and facing in the circumferential direction and in contact with a respective one of the flange drive surfaces, the plurality of engagement surfaces being asymmetrical relative to a plane defined by the center axis and a radial projection from the center axis that bisects the sprocket segment body midway between the leading edge and the trailing edge.

BRIEF DESCRIPTION OF THE DRAWINGS

Embodiments of inventions will now be described, strictly by way of example, with reference to the accompanying drawings, in which.

4

Figure 1:
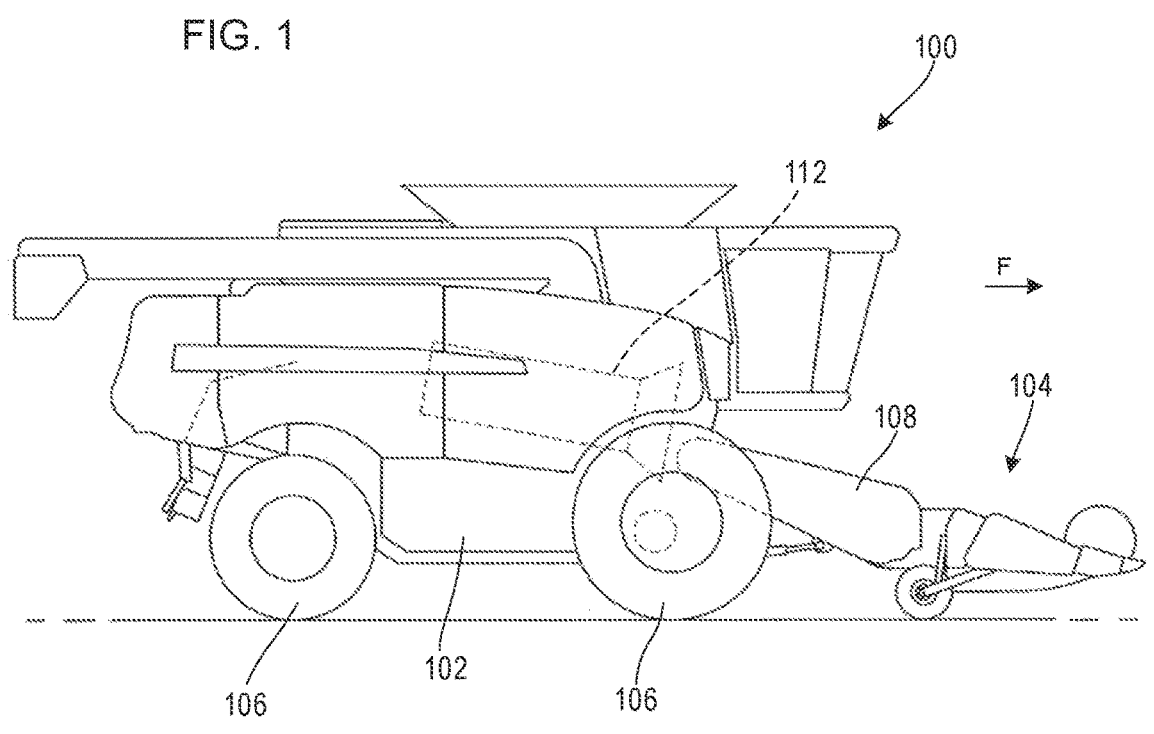
FIG. 1 schematically illustrates a prior art agricultural harvester.

In the figures, like reference numerals refer to the same or similar elements.

DETAILED DESCRIPTION OF EXEMPLARY EMBODIMENTS

The drawing figures depict one or more implementations in accordance with the present concepts, by way of example only, not by way of limitations. The examples are shown in conjunction with an agricultural combine harvester, but have applicability in any similar agricultural vehicle, such as a windrower.

Figure 2:
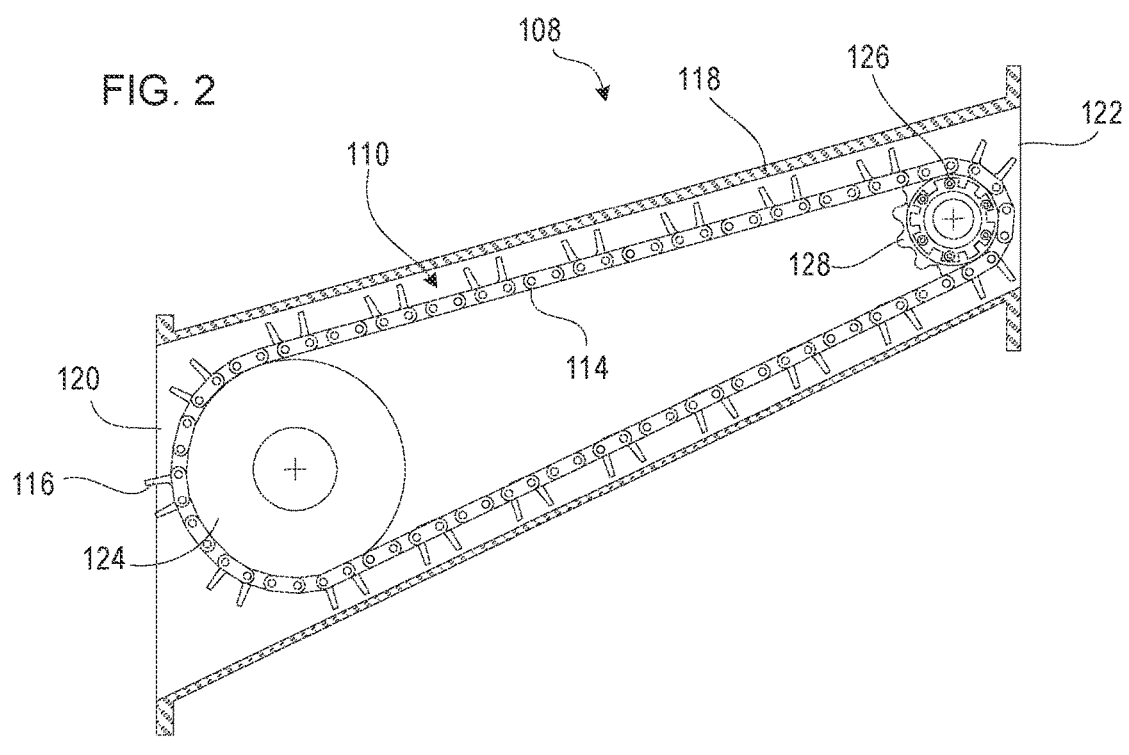
FIG. 2 is a partially cutaway side view of a prior art feeder assembly.

FIGS. 1 and 2, show an exemplary embodiment of an agricultural vehicle 100 in the form of a combine harvester. The vehicle 100 generally includes a chassis 102 and a header 104 carried by the chassis 102. The chassis 102 is supported on driving wheels 106 (e.g., tracked wheels or pneumatic tires), as known in the art. The vehicle 100 is configured to move in a forward direction, illustrated as arrow F, during harvesting operations.

The header 104 is connected to the chassis 102 by a feeder assembly 108, which includes a conveyor 110 configured to collect crop material and direct it to a threshing and separating system 112 inside the vehicle 100, such as known in the art. It should also be appreciated that the header 104 described and illustrated herein does not necessarily need to be included on a combine harvester, but can be incorporated in other agricultural vehicles such as mowers. The feeder assembly 108 may be a simple rigid connection or an articulated connection comprising one or more linkage arms and/or feeder housing actuators (e.g., hydraulic pistons/cylinder actuators) that operate as housing position control mechanisms, as known in the art.

As shown in FIG. 2, the conveyor 110 comprises a plurality of chains 114 that support a plurality of slats 116, or "paddles." The chains 114 and slats 116 are contained within a housing 118. The housing 118 extends from an inlet opening 120 at the header 104, to an outlet opening 122 at the chassis 102. The conveyor 110 is supported adjacent the inlet opening 120 by a front drum 124, and at the rear opening 122 by a topshaft 126. The topshaft 126 includes sprockets 128 that engage the links of the chains 114. The sprockets 128 are connected to the topshaft 126 to transmit rotational torque between the chains 114 and the topshaft 126. The topshaft 126 may be directly driven by a motor and gearbox (not shown), or it may be an unpowered idler shaft. In either case, the sprockets 128 preferably do not rotate relative to the topshaft 126, and thereby provide a timing function to cause all of the chains 114 to rotate in unison. In FIG. 2, only one chain 114 and sprocket 128 are visible, but it will be understood that multiple chains 114 and sprockets 128 are provided along the width of the feeder assembly 108 (i.e., into the depth of the page).

Figure 3:
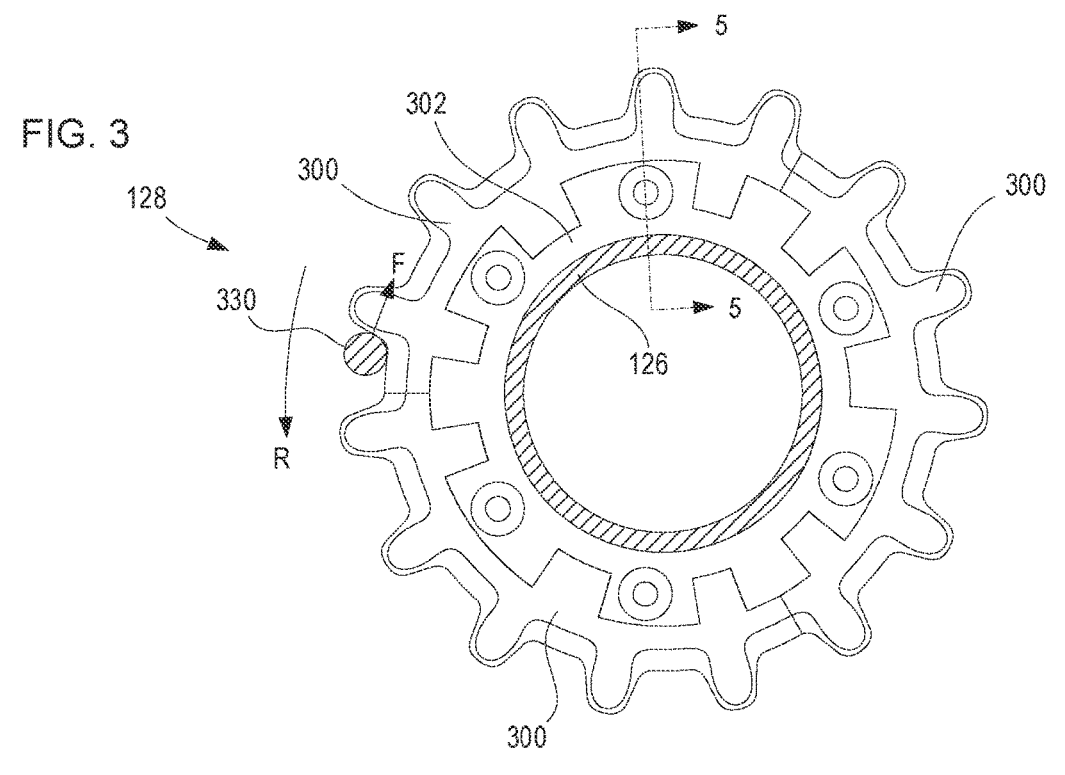
FIG. 3 is a side view of an exemplary assembled sprocket assembly.
Figure 4:
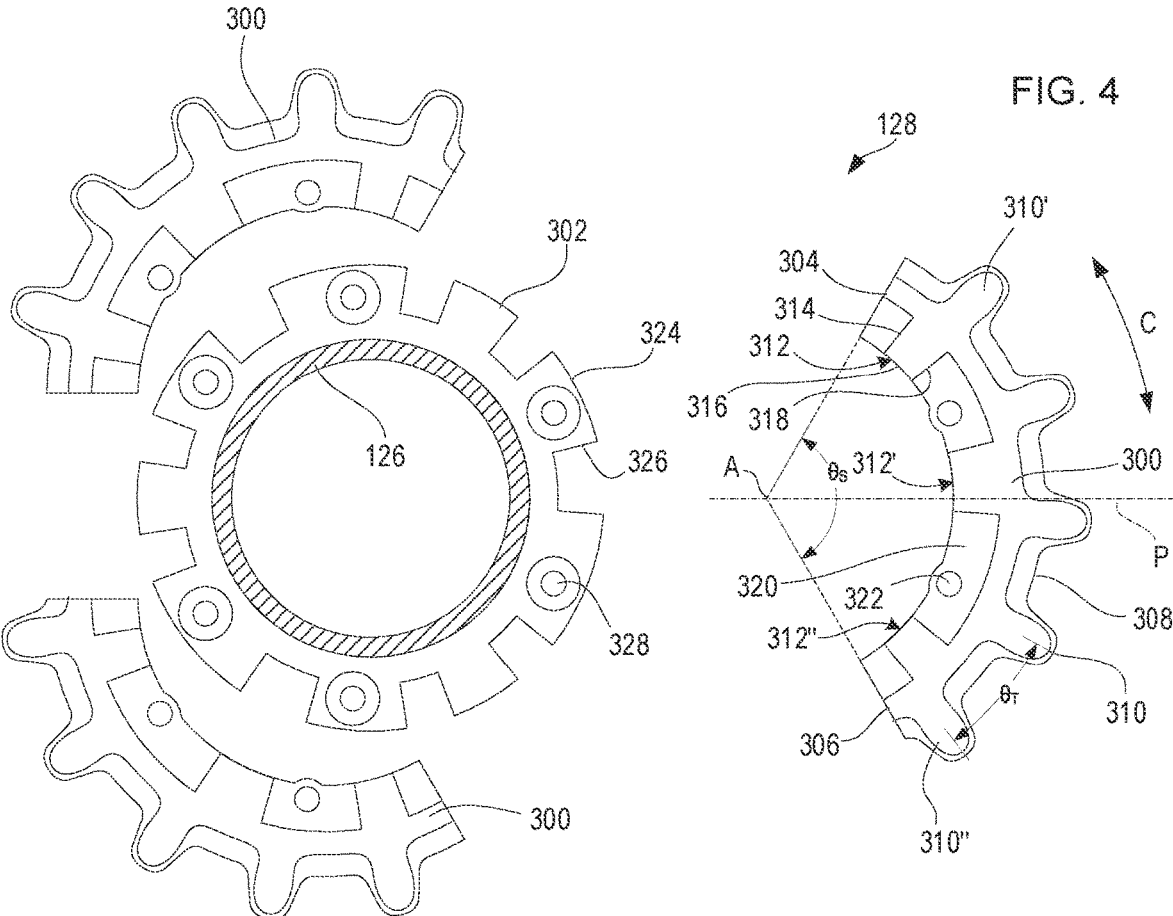
FIG. 4 is a side exploded view of the sprocket assembly of FIG. 3.
Figure 5:
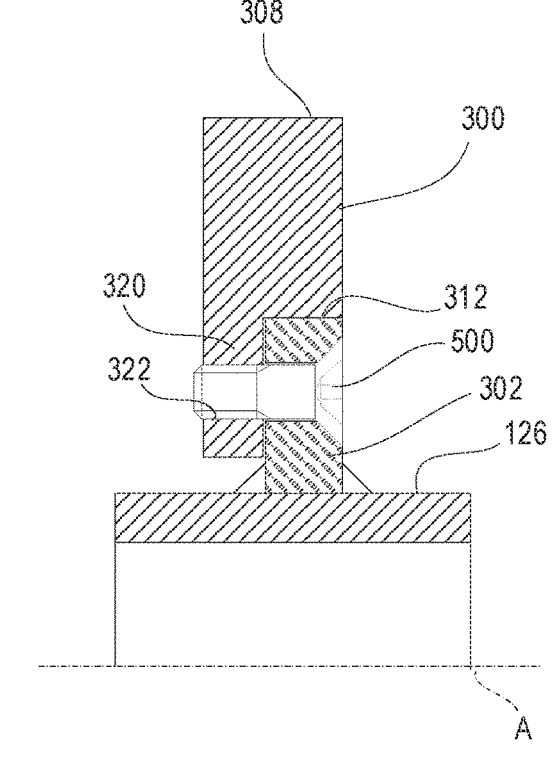
FIG. 5 is a cross-sectional view of the sprocket assembly of FIG. 3 as shown along line 5-5 thereof.

The inventors have determined that service of the topshaft 126 and sprockets 128 can be made more efficient and cost-effective by forming the sprockets 128 from multiple preferably identical segments that are attached to a flange that is rigidly mounted to the topshaft 126. An example of this construction is illustrated in FIGS. 3-5. Here, the sprocket 128 is formed by three sprocket segments 300 that are connected to a flange 302, and the flange 302 is rigidly attached to the topshaft 126 by welding or the like.

As best shown in FIG. 4, each sprocket segment 300 comprises a body that extends in a circumferential direction C around a center axis A from a leading edge 304 to a trailing edge 306. The leading edge 304 and trailing edge 306 subtend a segment angle θS about the center axis A. The segment angle θS is a unit fraction of 360° (e.g., ½, ⅓, ¼, etc.). Thus, a whole number of sprocket segments 300 fit around the center axis A with the leading edge 304 of each sprocket segment 300 adjacent (and preferably contacting) the trailing edge 306 of the adjacent sprocket segment 300. In this case, the segment angle is equal to 120°, which is ⅓ of 360°, and so three sprocket segments 300 fit around the center axis A.

The leading edge 304 and trailing edge 306 preferably are complementary shapes that match at the outer perimeter for form a smooth transition from one segment 300 to the next. For example, the leading edges 304 and trailing edges 306 in FIGS. 3-5 both comprise flat faces that extend radially from the center axis A. In other cases, the leading and trailing edges 304, 306 may have interlocking shapes, such as one being a concave cylindrical shape and the other being a convex cylindrical shape. As another example, the leading and trailing edges 304, 306 may be angled relative to the radial direction (e.g., swept back or swept forward). Other alternatives and variations will be apparent to persons of ordinary skill in the art in view of the present disclosure.

Each sprocket segment 300 has an outer sprocket perimeter 308 having a plurality of teeth 310 evenly arranged in the circumferential direction C about the center axis A. Each tooth 310 is spaced by a tooth angle θT from each adjacent tooth 310. The tooth angle θT is also a unit fraction of 360°. Thus, when the sprocket segments 300 are installed, the teeth 310 of all of the sprocket segments 300 are all spaced evenly around the outer circumference of the sprocket 128. In the shown example, there are fifteen teeth 310 in total, with the tooth angle θT being 24°.

The teeth 310 may have different offsets from the leading edge 304 and trailing edge 306. For example, in FIGS. 3 and 4, the foremost tooth 310' may relatively far from the leading edge 304, and the rearmost tooth 312" may be relatively close to the trailing edge 306. This may be beneficial to displace torque loads away from the ends of the sprocket segment 300. For example, the sprocket 128 may be powered to drive in a rotation direction R, such that loads F caused by the teeth 310 engaging the chain pins 330 are displaced from the leading edge 304.

Each sprocket segment 300 also has a plurality of engagement surfaces 312 that extend towards the center axis A and face (at least partially) in the circumferential direction C. In the example, of FIGS. 3-5, there are three engagement surfaces 312 per sprocket segment 300. The engagement surfaces 312 are arranged such that they are asymmetrical relative to a plane P defined by the center axis A and a radial projection from the center axis A that bisects the sprocket segment body midway between the leading edge 304 and the trailing edge 306. Thus, if the sprocket segment 300 is rotated to swap the positions of the leading edge 304 and the trailing edge 306 (i.e., rotated about a radial line extending along the plane P), some or all of the engagement surfaces 312 will be at different locations relative to their original positions. The purpose of this configuration is discussed below.

In the embodiment of FIGS. 3-5, the engagement surfaces 312 comprise crenellation-like inward radial projections that extend towards the center axis A. As noted above, each engagement surface 312 has at least one component that faces in the circumferential direction C. For example, in FIGS. 3-5, each engagement surface 312 has a front face 314 that extends radially towards the center axis A and perpendicular to the circumferential direction C, an intermediate face 316 that extends along the circumferential direction C, and a back face 318 that extends radially towards the center axis A and perpendicular to the circumferential direction C. The front face 314 and back face 318 both face in the circumferential direction C, and more specifically face perpendicular to the circumferential direction C. The intermediate face 316 is parallel to, and thus does not face, the circumferential direction C.

A web 320 may extend circumferentially between some or all of the engagement surfaces 312, at a position that is offset along the center axis A, such that the web 320 does not occupy the space directly between the engagement surfaces 312. An example of this is shown in FIG. 5. The web 320 may include one or more fastener holes 322.

As noted above, the flange 302 is rigidly secured to, and extends radially from, the topshaft 126. The flange 302 has a plurality of flange drive surfaces 324 that extend away from the center axis A. The flange drive surfaces 324 are configured to intermesh with the engagement surfaces 312 of the sprocket segments 300. This engagement provides driving contact between the flange 302 and the sprocket segments 300, so that torque forces applied to the sprocket segments 300 are conveyed to the topshaft 126 directly through the flange 302, and vice-versa. For example, each front face 314 of the inward radial projections of the sprocket segments 300 may contact a corresponding back face 326 of a corresponding flange drive surface 324.

In the example of FIGS. 3-5, the mating faces 314, 326 are both perpendicular to the circumferential direction C, which is beneficial for generating a tangential drive force that does not have a substantial radial component generating compressive or tensile radial loads on the parts. Also, as best shown in FIG. 3, the flange drive surfaces 324 preferably fill the entire circumferential space between the adjacent engagement surfaces 312, which helps maximize the engagement surface area and distribute torque during operation.

The direct transmission of drive torque between the flange drive surfaces 324 and the engagement surfaces 312 is particularly advantageous to reduce or eliminate the magnitude of drive torque carried by fasteners holding the sprocket segments 300 to the flange 302. For example, the sprocket segments 300 may be attached to the flange 302 by countersunk screws 500 or other threaded fasteners, such as shown in FIG. 5, that extend parallel to the center axis A. The screws 500 are installed in through-holes 328 in the flange drive surfaces 324, and thread into the fastener holes 322 in the sprocket segment webs 320. During operation, the flange drive surfaces 324 and engagement surfaces 312 intermesh to transmit torque, thus effectively isolating the screws 500 from such loads. This allows the screws 500 or other fasteners to be relatively lightweight will still providing a long service life and fatigue resistance, and reduces the likelihood that a single failed or loose fastener will cause a failure of the assembly as a whole.

The foregoing arrangement of the screws 500 is also advantageous from a service standpoint. For example, a technician can install and remove the screws 500 by working from the side, along an axis parallel to the center axis A, which allows loosening and tightening while the chain 114 is still in place. Furthermore, if the topshaft 126 can be positioned such that the chain 114 does not engage any teeth 310 of a given sprocket segment 300 (e.g., as shown in FIG. 2), then the sprocket segments 300 can be removed and replaced one at a time without removing the chain 114 or even removing a preloaded tension from the chain 114. For example, if the chain 114 wraps around less than ⅔ of the assembled sprocket 128, and the sprocket 128 is provided as three sprocket segments 300, then the topshaft 126 can be rotated such that one sprocket segment 300 is out of engagement with the chain 114 to allow removal and replacement of that sprocket segment 300. The process can then be repeated for each remaining sprocket segment 300.

The sprocket engagement surfaces 312 and flange drive surfaces 324 are also configured to prevent the sprocket segments 300 from being mounted on the flange 302 at any position other than a discrete number of predetermined locations. This may be accomplished by forming the engagement surfaces 312 with an asymmetrical profile relative to the center radial plane P, as discussed above, and matching this asymmetrical profile with a repeating pattern of flange drive surfaces 324. For example, the sprocket engagement surfaces 312 may have varying sizes or spacings with respect to the circumferential direction C, with such variations being matched by a repeating pattern in the shapes of the flange drive surfaces 324.

In the example of FIGS. 3-5, the sprocket engagement surfaces 312 have both different sizes (e.g., surface 312' extends a greater circumferential distance than surface 312"), and different spacings (e.g., the space between surface 312 and 312' is smaller than the space between surface 312' and 312"). The flange drive surfaces 324 are provided in three sets that match the varying shapes and spacings of the sprocket engagement surfaces 312. Thus, each sprocket segment 300 can only be mounted in three discrete positions on the flange 302 at which the sprocket engagement surfaces 312 match the flange drive surfaces 324. It will be understood, that it is not strictly necessary to have both differing sizes and differing spacings. Furthermore, different sizes and spacings can be supplemented with or replaced by different shapes, radial depths or other variations in shape that create an asymmetric shape as described above.

This foregoing configuration, and others embodying the same principles, allows the sprocket 128 to be formed by multiple identical sprocket segments 300, without a risk of improperly installing a sprocket segment 300 at an incorrect location on the flange 302. Furthermore, the sprocket segments 300 can only be mounted in one rotation direction. This is beneficial to ensure that the teeth 310 are oriented at the same angle before and after service, which maintains the chains 114 in correct timing relative to each other.

Figure 6:
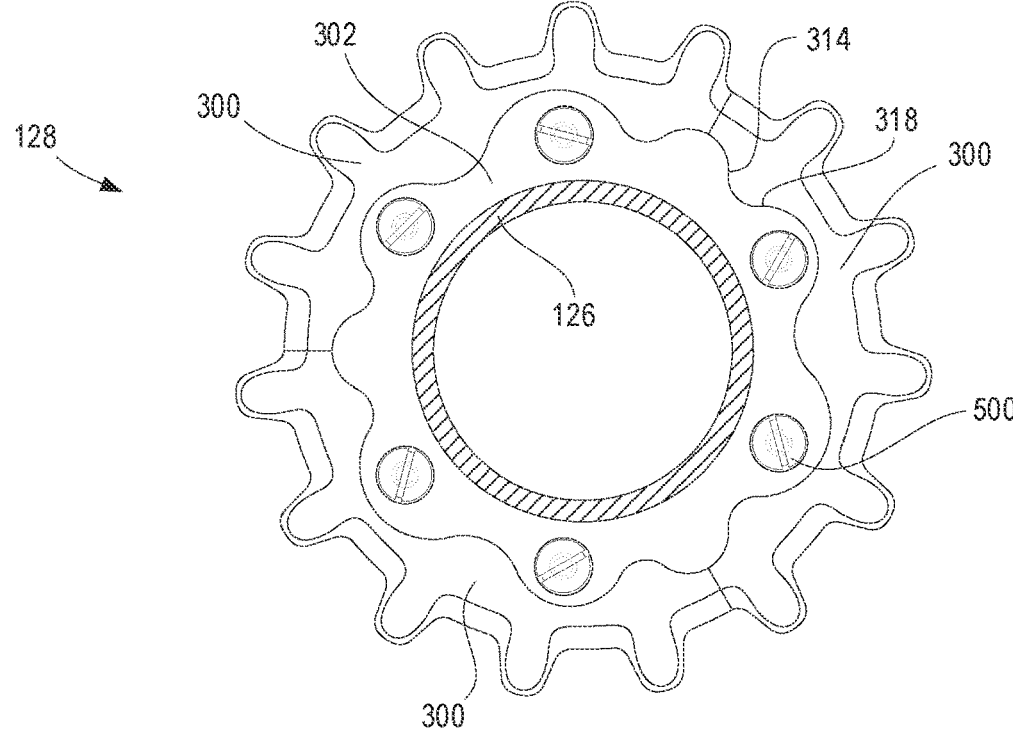
FIG. 6 is a side view of another exemplary assembled sprocket assembly.

FIG. 6 illustrates an alternative embodiment, in which the sprocket segment engagement surfaces 312 are formed as inward radial projections having curved faces. In particular, each inward radial projection comprises a curved front face 314 that extends towards the center axis A, and a curved back face 318 that extends towards the center axis A. The front face 314 and the back face 318 both face in the circumferential direction C, but neither is perpendicular to the circumferential direction C. Thus, a torque load between the sprocket segments 300 and flange 302 will generate a radial vector component that may require consideration when designing the parts to withstand the operating loads, and may generate some radial force on the fasters 500.

Figure 7:
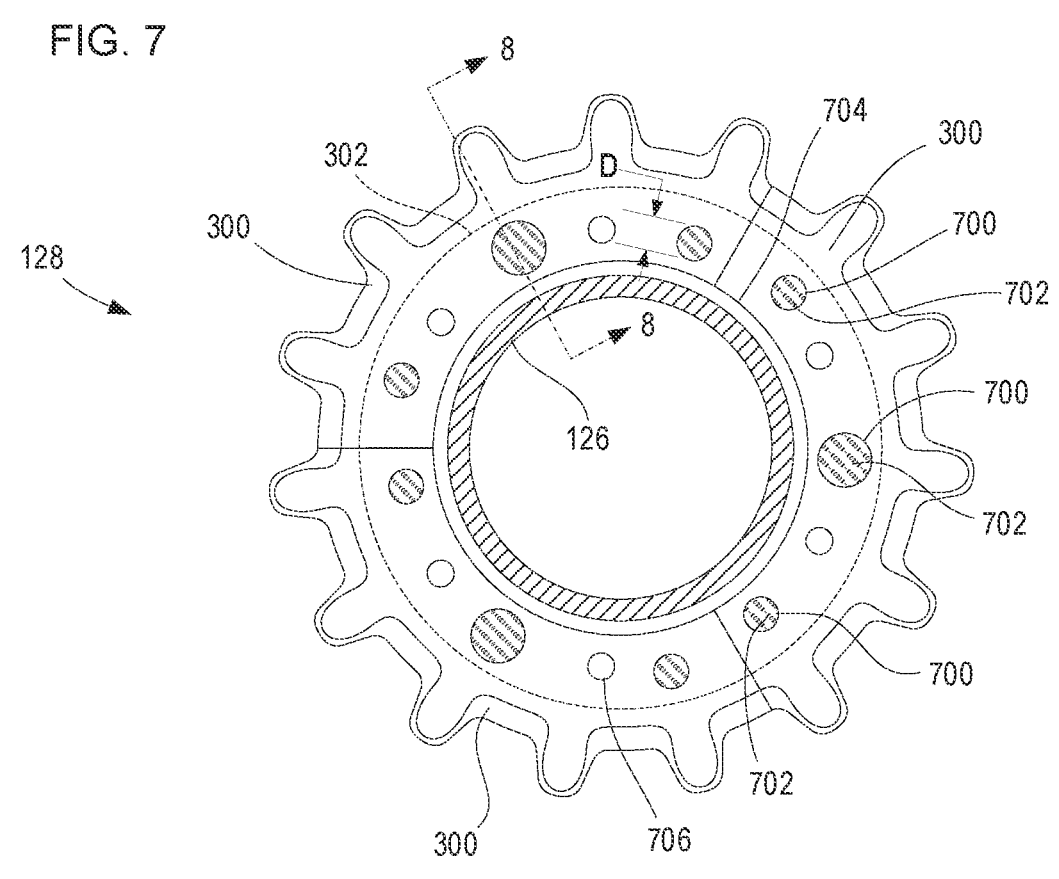
FIG. 7 is a side view of another exemplary assembled sprocket assembly.
Figure 8:
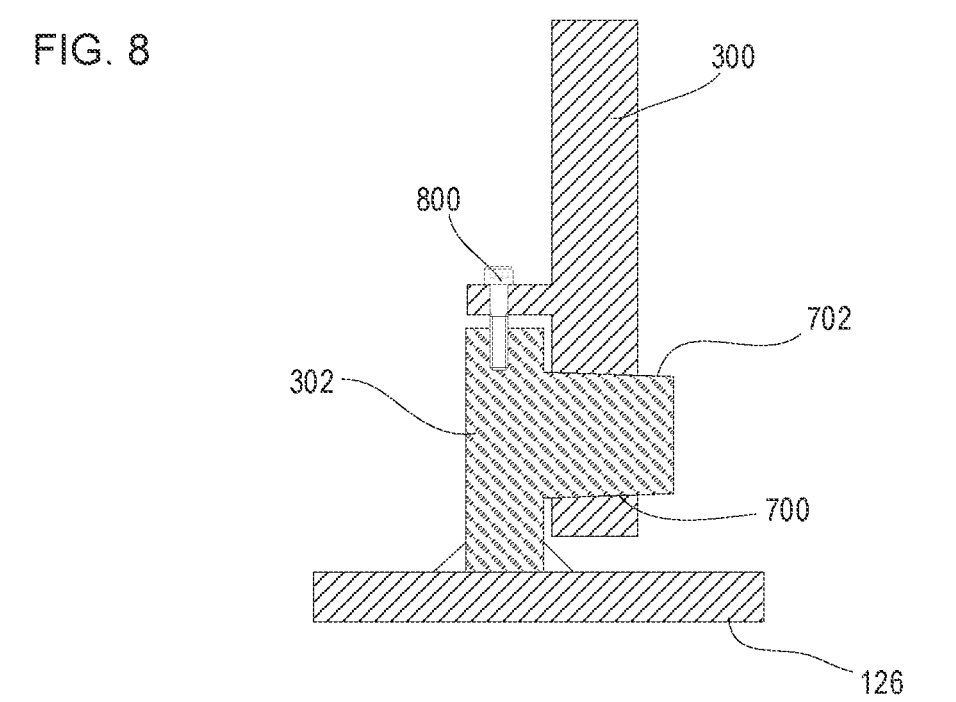
FIG. 8 is a cross-sectional view of the sprocket assembly of FIG. 7 as shown along line 8-8 thereof.

FIGS. 7 and 8 illustrate another exemplary embodiment. In this example, each sprocket segment 300 has engagement surfaces formed as enclosed passages 700 (holes or slots) that extend parallel to the center axis A. Here, the flange drive surfaces are formed as pins 702 that fit into the enclosed passages 700. As shown in FIG. 8, the pins 702 and passages 700 may have matching tapers to ensure a tight engagement between them. The engagement surfaces 312 may be provided in an asymmetrical arrangement, such as discussed above, by altering their radial distances from the center axis A, altering their sizes, altering the circumferential spacing between them, altering their shapes (e.g., one round and one square), and so on.

As with the previous embodiments, the sprocket segment engagement surfaces extend towards the center axis A, but they do not extend to the radial inward edge 704 of the sprocket segment 300. Similarly, the flange drive surfaces extend away from the center axis A, but they only span a discrete radial distance D that begins outside the radial inward edges 704 of the sprocket segments 300. Thus, the flange drive surfaces project axially from the remainder of the flange 302, as shown in FIG. 8.

The sprocket segments 300 preferably also include fastener holes 706 that correspond to fastener holes in the flange 302, to allow fasteners to be installed parallel to the center axis direction. Alternatively, in this embodiment or other in other embodiments, fasteners 800 may be installed in a radial direction (or at some other angle) to join the sprocket segments 300 to the flange 302, such as shown in FIG. 8.

It will be appreciated that the embodiments described above are exemplary, and other embodiments may be constructed having different numbers of sprocket segments, different shapes of engagement surfaces and drive surfaces, and so on. Embodiments also may be used in any various different applications within agricultural equipment or the like, and are expected to be particularly useful where the sprockets are subject to relatively high wear and are not readily serviced using conventional means.

Embodiments also may be provided in a variety of different forms. For example, embodiments may be provided as a single sprocket segment replacement part, a collection of sprocket segments that form a complete sprocket when assembled, an assembly of a topshaft or other shaft having one or more flanges affixed to the shaft and sprocket segments removably attachable to the flanges, or an agricultural feeder assembly or vehicle having any of the foregoing features.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A feeder housing shaft sprocket segment comprising:
a sprocket segment body extending in a circumferential direction around a center axis from a leading edge to a trailing edge, wherein the leading edge and trailing edge subtend a segment angle about the center axis, the segment angle being a first unit fraction of 360°;
an outer sprocket perimeter comprising a plurality of teeth evenly arranged in the circumferential direction about the center axis with each tooth spaced by a tooth angle from each adjacent tooth, the tooth angle being a second unit fraction of 360°; and
a plurality of engagement surfaces extending towards the center axis and facing in the circumferential direction, the plurality of engagement surfaces being asymmetrical relative to a plane defined by the center axis and a radial projection from the center axis that bisects the sprocket segment body midway between the leading edge and the trailing edge.

2. The feeder housing shaft sprocket segment of claim 1, wherein the segment angle is 120°.

3. The feeder housing shaft sprocket segment of claim 1, wherein the plurality of engagement surfaces are located at an inner sprocket perimeter and comprise a plurality of inward radial projections.

4. The feeder housing shaft sprocket segment of claim 3, wherein the at least one inward radial projection comprises a front face extending radially towards the center axis and perpendicular to the circumferential direction.

5. The feeder housing shaft sprocket segment of claim 3, further comprising a web extending circumferentially between at least two of the inward radial projections and offset from the at least two of the inward radial projections along the center axis.

6. The feeder housing shaft sprocket segment of claim 5, wherein the web comprises a fastener hole.

7. The feeder housing shaft sprocket segment of claim 3, wherein at least one of the inward radial projections comprises a curved front face extending towards the center axis.

8. The feeder housing shaft sprocket segment of claim 1, wherein at least one of the plurality of engagement surfaces comprises an enclosed passage extending parallel to the center axis.

9. A feeder housing shaft sprocket assembly comprising:
a shaft configured to rotate about a center axis;
a flange rigidly secured to and extending radially from the shaft, the flange comprising a plurality of flange drive surfaces extending away from the center axis; and
a plurality of sprocket segments releasably secured to the flange, wherein each sprocket segment comprises:
a sprocket segment body extending in a circumferential direction around a center axis from a leading edge to a trailing edge, wherein the leading edge and trailing edge subtend a segment angle about the center axis, the segment angle being a first unit fraction of 360°,
an outer sprocket perimeter comprising a plurality of teeth evenly arranged in the circumferential direction about the center axis with each tooth spaced by a tooth angle from each adjacent tooth, the tooth angle being a second unit fraction of 360°, and
a plurality of engagement surfaces extending towards the center axis and facing in the circumferential direction and in contact with a respective one of the flange drive surfaces, the plurality of engagement surfaces being asymmetrical relative to a plane defined by the center axis and a radial projection from the center axis that bisects the sprocket segment body midway between the leading edge and the trailing edge.

10. The feeder housing shaft sprocket assembly of claim 9, wherein the flange is permanently fixed to the shaft.

11. The feeder housing shaft sprocket assembly of claim 9, wherein the segment angle is 120°.

12. The feeder housing shaft sprocket assembly of claim 9, wherein the plurality of flange drive surfaces are located on a flange outer perimeter and comprise a plurality of outward radial projections.

13. The feeder housing shaft sprocket assembly of claim 12, wherein:
the plurality of engagement surfaces of each of the plurality of sprocket segments are located at a respective inner sprocket perimeter of each sprocket segment;
the plurality of engagement surfaces of each of the plurality of sprocket segments comprise a respective plurality of inward radial projections; and the respective plurality of inward radial projections contact an adjacent set of the plurality of outward radial projections of the flange.

14. The feeder housing shaft sprocket assembly of claim 13, wherein the at least one inward radial projection comprises a front face extending radially towards the center axis and perpendicular to the circumferential direction.

15. The feeder housing shaft sprocket assembly of claim 13, further comprising a web extending circumferentially between at least two of the inward radial projections and offset from the at least two of the inward radial projections along the center axis.

16. The feeder housing shaft sprocket assembly of claim 15, wherein the web comprises a fastener hole that is offset along the center axis from a corresponding fastener hole in the flange.

17. The feeder housing shaft sprocket assembly of claim 13, wherein at least one of the inward radial projections comprises a curved front face extending towards the center axis.

18. The feeder housing shaft sprocket assembly of claim 9, wherein the plurality of flange drive surfaces comprise a plurality of pins extending along the center axis, and wherein the plurality of engagement surfaces each comprises an enclosed passage extending parallel to the center axis.

19. A feeder housing shaft sprocket assembly comprising:
a shaft configured to rotate about a center axis;
a flange rigidly secured to and extending radially from the shaft and having a repeating pattern of flange drive surfaces; and
a plurality of sprocket segments releasably secured to the flange, each sprocket segment having an outer sprocket perimeter comprising a plurality of teeth and a plurality of engagement surfaces configured to engage only a respective portion of the repeating pattern of flange drive surfaces;
wherein the teeth of the plurality of sprocket segments are configured to be spaced evenly about the center axis when all of the sprocket segments are secured to the flange,
and the repeating pattern of flange drive surfaces and the plurality of engagement surfaces are configured to prevent connection of the plurality of sprocket segments to the flange in a reversed orientation, and wherein, for each sprocket segment, the plurality of engagement surfaces being asymmetrical relative to a plane defined by the center axis and a radial projection from the center axis that bisects the sprocket segment body midway between the leading edge and the trailing edge.

20. An agricultural vehicle comprising:
a chassis configured for movement on a surface;
a header configured to remove crop material from the surface; and
a feeder assembly connected between the header and the chassis, and configured to convey the crop material from the header to the chassis, the feeder assembly comprising a feeder housing and a feeder conveyor located in the feeder housing and supported by a feeder shaft assembly, the feeder shaft assembly comprising:
a shaft configured to rotate about a center axis;
a flange rigidly secured to and extending radially from the shaft, the flange comprising a plurality of flange drive surfaces extending away from the center axis; and a plurality of sprocket segments releasably secured to the flange, wherein each sprocket segment comprises:

a body extending in a circumferential direction around a center axis from leading edge to a trailing edge, wherein the leading edge and trailing edge subtend a segment angle about the center axis, the segment angle being a first unit fraction of 360°, an outer sprocket perimeter comprising a plurality of teeth evenly arranged in the circumferential direction about the center axis with each tooth spaced by a tooth angle from each adjacent tooth, the tooth angle being a second unit fraction of 360°, and a plurality of engagement surfaces extending towards the center axis and facing in the circumferential direction and in contact with a respective one of the flange drive surfaces, the plurality of engagement surfaces being asymmetrical relative to a plane defined by the center axis and a radial projection from the center axis that bisects the sprocket segment body midway between the leading edge and the trailing edge.

\* \* \* \* \*